United States Patent
Lin et al.

(10) Patent No.: US 10,780,439 B2
(45) Date of Patent: Sep. 22, 2020

(54) MAGNETIC SCREWDRIVER DEVICE

(71) Applicant: Industrial Technology Research Institute, Hsin-Chu (TW)

(72) Inventors: Chang-Min Lin, Taoyuan (TW); Wei-Chieh Chang, Tainan (TW); Hsuan-Yu Huang, Chiayi (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 272 days.

(21) Appl. No.: 16/118,607

(22) Filed: Aug. 31, 2018

(65) Prior Publication Data
US 2020/0070149 A1   Mar. 5, 2020

(51) Int. Cl.
| | | |
|---|---|---|
| *B01L 3/00* | (2006.01) | |
| *G01N 35/04* | (2006.01) | |
| *B67B 3/20* | (2006.01) | |
| *B25B 23/142* | (2006.01) | |

(52) U.S. Cl.
CPC ........ *B01L 3/50825* (2013.01); *B67B 3/2066* (2013.01); *G01N 35/04* (2013.01); *G01N 2035/0405* (2013.01)

(58) Field of Classification Search
CPC ............... B25B 23/142; B25B 23/1427; B01L 3/50825; B67B 3/2066; G01N 35/04; G01N 2035/0405
See application file for complete search history.

(56) References Cited

U.S. PATENT DOCUMENTS

| | | | |
|---|---|---|---|
| 4,825,992 A | | 5/1989 | Skrobisch |
| 6,029,551 A | * | 2/2000 | Wu .......................... B25B 15/02 81/429 |
| 7,181,892 B1 | | 2/2007 | Scott et al. |
| 7,484,427 B2 | * | 2/2009 | Kolkind ................ B25B 23/103 73/761 |
| 7,788,997 B2 | * | 9/2010 | Kozak ..................... B25B 15/02 81/451 |
| 8,474,225 B2 | | 7/2013 | Kramer et al. |
| 8,562,909 B2 | | 10/2013 | Schacher |

(Continued)

FOREIGN PATENT DOCUMENTS

| | | |
|---|---|---|
| CN | 2717622 Y | 8/2005 |
| CN | 201246422 Y | 5/2009 |

(Continued)

OTHER PUBLICATIONS

Wendy Lorimer and Albert Hartman, "Magnetization Pattern for Increased Coupling in Magnetic Clutches", Sep. 1997, pp. 4239-4241 vol. 33, No. 5, IEEE Transactions on Magnetics.

(Continued)

*Primary Examiner* — David B. Thomas
(74) *Attorney, Agent, or Firm* — WPAT, PC

(57) ABSTRACT

A magnetic screwdriver device includes one pad without magnetism, one driving shaft, and one driven shaft. The two shafts, which have magnetic attraction between each other, are disposed on opposite sides of the pad respectively and attract to each other. The driving shaft is used to transmit torque to actuate the driven shaft rotation. When the torque out of predetermined value overcomes the friction force between the driven shaft and the pad, the driven shaft will be stop.

9 Claims, 5 Drawing Sheets

(56) References Cited

U.S. PATENT DOCUMENTS

| | | |
|---|---|---|
| 9,388,031 B2 | 7/2016 | Schoenfelder |
| 9,796,574 B2 | 10/2017 | Frey et al. |
| 2007/0261868 A1 | 11/2007 | Gross |
| 2008/0022808 A1 | 1/2008 | Owen et al. |
| 2008/0247914 A1 | 10/2008 | Edens et al. |
| 2009/0056285 A1 | 3/2009 | Kramer et al. |

FOREIGN PATENT DOCUMENTS

| | | |
|---|---|---|
| CN | 201419373 Y | 3/2010 |
| CN | 105171491 A | 12/2015 |
| TW | 372907 | 11/1999 |
| TW | I330575 | 9/2010 |
| TW | M517668 | 2/2016 |
| TW | 201631871 | 9/2016 |

OTHER PUBLICATIONS

B. N. J. Persson, "Theory of rubber friction and contact mechanics", Aug. 22, 2001, pp. 3840-3861, vol. 115, No. 8, Journal of Chemical Physics.

Hyeon-Jae Shin et al., "Design and Analysis of Axial Permanent Magnet Couplings Based on 3D FEM", Jul. 2013, pp. 3985-3988, vol. 49, No. 7, IEEE Transactions on Magnetics.

A.V. Fedotov et al., "Analysis of the magnetized friction force", May 29-Jun. 2, 2006, pp. 210-214., Proceedings of HB2006, Tsukuba, Japan.

Gang-Hyeon Jang et al., "Torque characteristic analysis and measurement of axial flux-type noncontact permanent magnet device with Halbach array based on 3D analytical method", Feb. 3, 2017, American Institute of Physics.

Yushi Wang et al., "Exploiting the slip behavior of friction based clutches for safer adjustable torque limiters", Jul. 3-7, 2017, pp. 1346-1351, IEEE International Conference on Advanced Intelligent Mechatronics (AIM).

* cited by examiner

MAGNETIC SCREWDRIVER DEVICE

TECHNICAL FIELD

The disclosure relates in general to a magnetic screwdriver device, and more particularly a device which is suitable for miniaturization and arraying and which can treat capping or de-capping without overlocking.

BACKGROUND

It is known that various types of magnetic screwdriver devices, including electric magnetic screwdrivers, are used to apply for attaching components such as caps/lids or screws. Because of the complex structure and large size of those screwdriver devices, it is not suitable for applying to a large number of tiny caps or lids simultaneously processed.

For example, multiple micro sample tubes arranged in an array with small intervals are intend to simultaneously capping or de-capping (locking or unlocking). Conventional screwdriver devices however have the disadvantages that cannot process in mass or have the risk of overlocking.

Therefore there is a need for a capping or de-capping device which is suitable for apply to a multiple of tiny sample tubes.

SUMMARY

The disclosure relates in general to a magnetic screwdriver device, and more particularly a device which is suitable for miniaturization and arraying and which can treat capping or de-capping without overlocking.

According to one embodiment of the disclosure, a magnetic screwdriver device, comprising a pad without magnetism, a driving shaft and a driven shaft. The driving shaft having magnetic attraction property is disposed on one side of the pad and in touch with the pad. The driven shaft having magnetic attraction property is disposed on the opposite side of the pad. The two shafts, which have magnetic attraction between each other are disposed on two opposite sides of the pad respectively and attract to each other. The driving shaft is used to transmit torque to actuate the driven shaft rotation. The driven shaft will be stop when the torque exceeds a predetermined value.

The above and other aspects of the disclosure will become better understood with regard to the following detailed description of the preferred but non-limiting embodiment(s). The following description is made with reference to the accompanying drawings.

Figure 1:
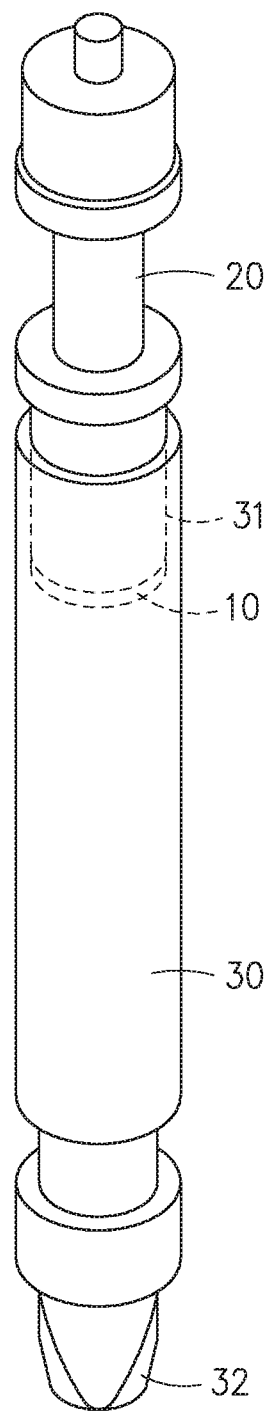
FIG. 1 is a schematic diagram of a magnetic screwdriver device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of embodiments are disclosed below with accompanying drawings for elaborating the disclosure. However, the embodiments are for exemplary and explanatory descriptions only, not for limiting the scope of protection of the disclosure.

Figure 2:
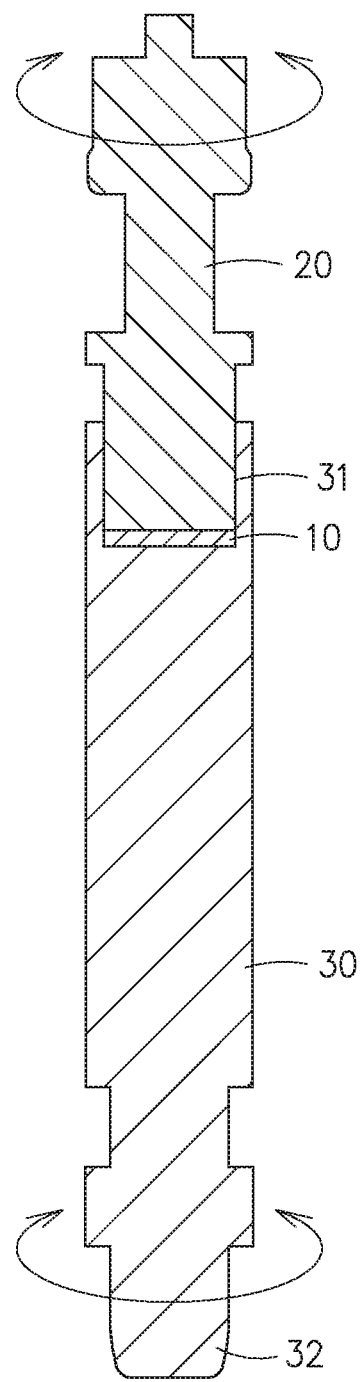
FIG. 2 is a cross-sectional view of the magnetic screwdriver device of FIG. 1.

Refer to FIGS. 1 and 2. FIG. 1 and FIG. 2 are schematic diagrams of a magnetic screwdriver device according to an embodiment. The magnetic screwdriver device 1 comprises a pad 10, a driving shaft 20, a driven shaft 30.

In an embodiment, the pad 10 without magnetism includes at least one of metal of plastic, rubber, ceramics and organic compound such as Polydimethylsiloxane (PDMS).

The driving shaft with magnetic attraction property is disposed on the side of the pad and in touch with the pad. The driven shaft is disposed on the opposite side of the pad respectively to the driving shaft and also in touch with the pad.

As indicated in FIG. 2, the axial end of the driven shaft 30 includes a first groove 31 for the pad 10 to put into. A part of the axial end of the driving shaft 20 extends into the first groove 31 and in touch with the pad 10. In the present embodiment, the bottom portion of the axial end of the driving shaft 20 is positioned in touch with the upper surface of the pad 10 and the top portion of the axial end of the driven shaft 30 is positioned in touch with the lower surface of the pad 10 respectively. In other words, the pad 10 is positioned in touch with of the inner surface of the first groove 31 of the driven shaft 30. The drive shaft 30 further connects to a screwdriver 32 in the opposite axial end in touch with the pad 10. The screwdriver 32 is used to engage with the lid of the workpiece prepared for capping or de-capping.

At least one of the driving shaft 20 and the driven shaft 30 includes magnet or metal with magnetic attraction property such that the two shafts have magnetic attraction between each other. In an embodiment, the driving shaft 20 includes metal with magnetism and the driven shaft 30 includes magnet. In another embodiment, the driving shaft 20 includes magnet and the driven shaft 30 includes metal with magnetism. In further another embodiment, both of the driving shaft 20 and the driven shaft 30 include magnets.

The two shafts 20 and 30 having magnetic attraction between each other are disposed on opposite sides of the pad 10 respectively and attract to each other. The driving shaft 20 being accurate to rotate is used to transmit torque to actuate the driven shaft 30 to rotate synchronously. For both of the two shafts 20 and 30 are in touch with the pad 10 individually, a torque can be generated according the friction force between the driving shaft 20 and the pad, and the friction force of between the driven shaft 30 and the pad 10. When the torque exceeds a predetermined value overcoming the friction force between the driven shaft 30 and the pad 10, the driven shaft 30 will be stop rotating.

Different magnitude of the torque can be generated by matching the pad 10, the driving shaft 20, and the driven shaft 30 with variable material and size. In one embodiment, the pad 10 being a circular plate includes Polydimethylsiloxane (PDMS) with 6 mm in diameter and 1 mm in thickness, and the two shafts 20 and 30 include alloy steel and Neodymium iron boron magnet respectively. The magnetic attraction force will be 7.63 Newton and a torque with 0.2~0.3 kgf-cm will be generated.

Figure 3:
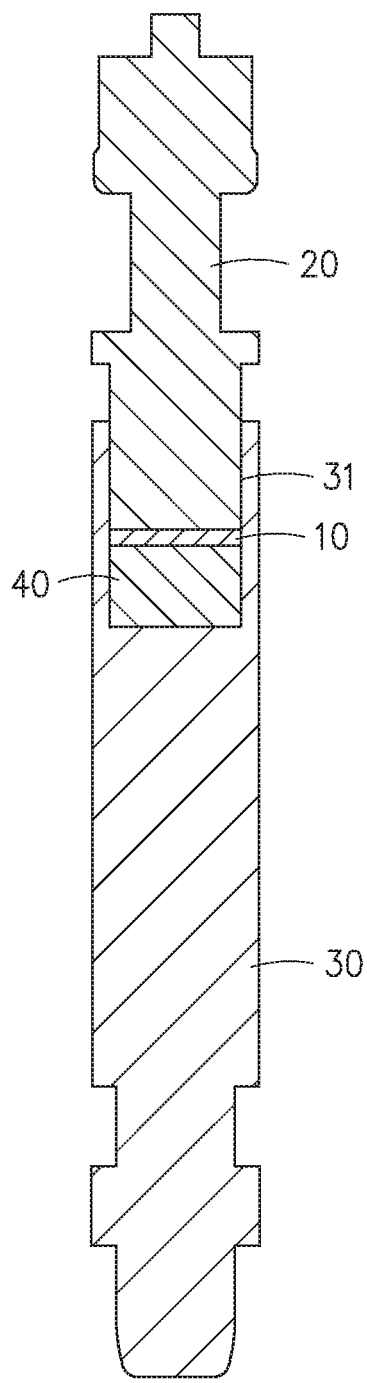
FIG. 3 to FIG. 6 are schematic diagrams of the magnetic screwdriver device according to other embodiments of the disclosure.

FIG. 3 is a schematic view illustrating a magnetic screwdriver device 1A according to another embodiment of the disclosure. A magnet 40 is attaching to the pad 10 nearby the driven shaft 30. The two shafts 20 and 30 can include metals with magnetic attraction property.

Figure 4:
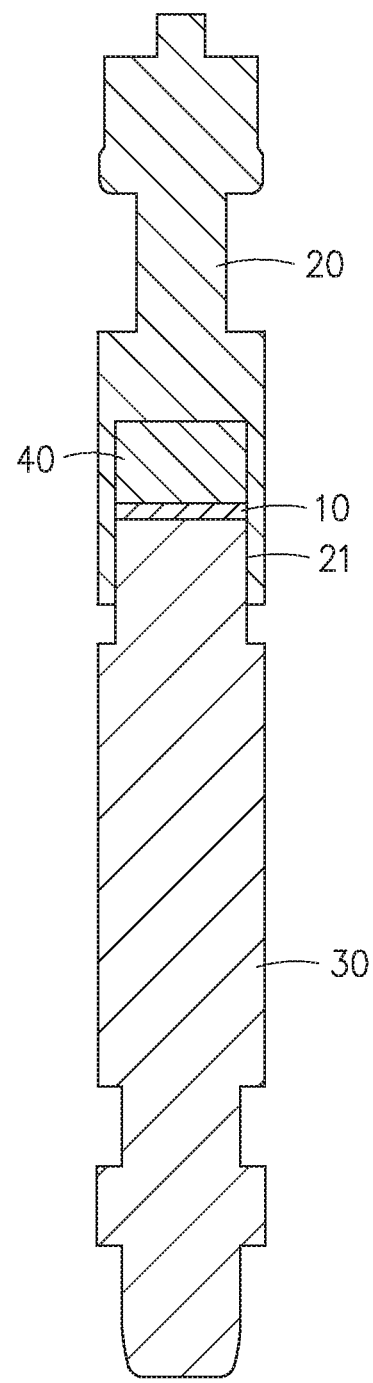

FIG. 4 is a schematic view illustrating a magnetic screwdriver device 1B according to further another embodiment of the disclosure. A magnet 40 is attaching to the pad 10 nearby the driving shaft 20, and the axial end of the driving shaft 20 includes a second groove 21 for the pad 10 to put into. A part of the axial end of the driven shaft 30 extends into the second groove 21 and in touch with the pad 10.

Figure 5:
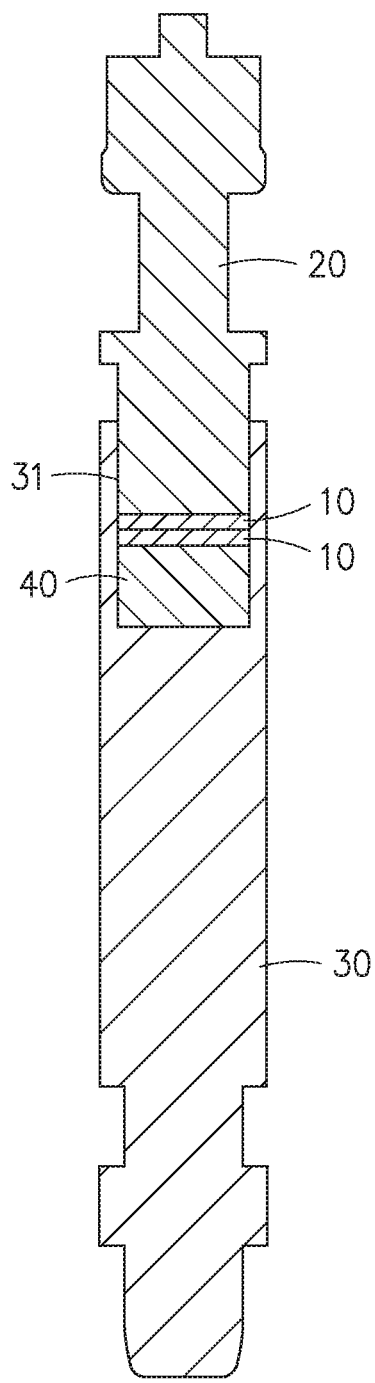

FIG. 5 is a schematic view illustrating a magnetic screwdriver device 1C according to further another embodiment of the disclosure. Two pads 10 are displaced in an overlapping form.

Figure 6:
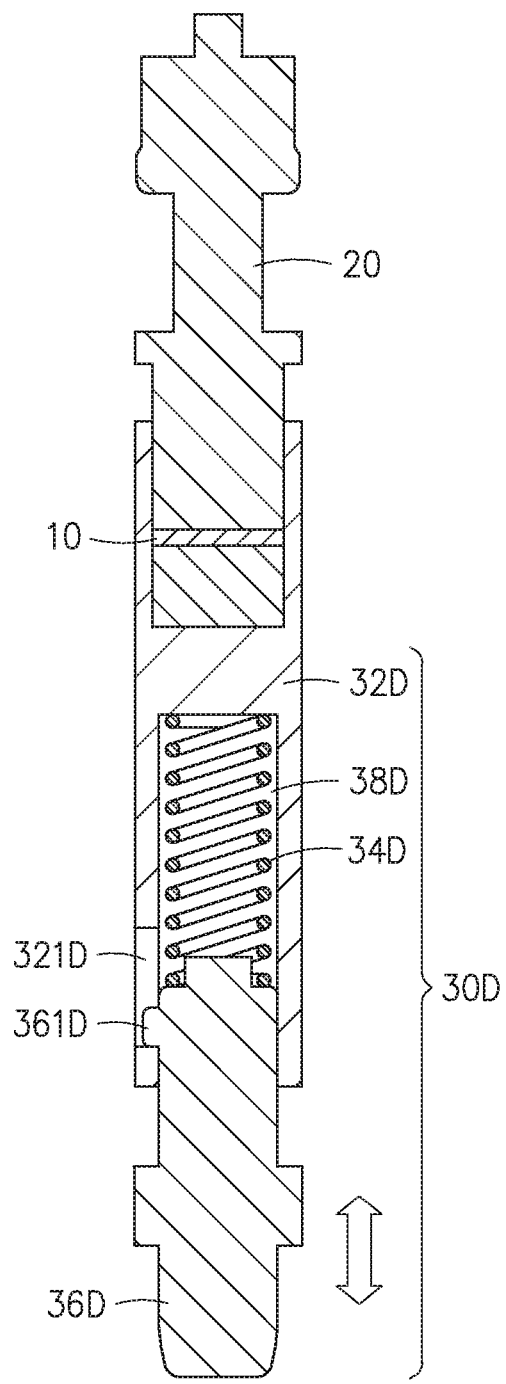

According to one embodiment, as Indicated in FIG. 6, the driven 30D the driving shaft 20 comprises an axle body 32D, a buffer element 34D and a screwdriver 36D. The pad 10 and the driving shaft 20 are displaced nearby one axial end of the axle body 32D, and another axial end of the axle body 32D includes a third groove 38D. The buffer element 34D id displaced in the third groove 38D. The screwdriver 36D included an axial end extending into the third groove 38D and in touch with the buffer element 34D. In one embodiment, the buffer includes a spring. Furthermore, the axle body 32D comprises a slot 321D being in connected to the third groove 38D and the longitudinal direction of the slot 321D is parallel to the axis of the axle body 32D. The axial end of the screwdriver 36D extending into the third groove 38D comprises a convex part 361D being embed in the slot 321D. By arrangement mentioned above, while the screwdriver 36D engages with the lid of the workpiece prepared for capping or de-capping then be push into the third groove 38D, the convex part 361D can move inside the slot 321D and the cushioning force resulting from the buffer element 34D prevents impact damage to the screwdriver 36D.

Figure 7:
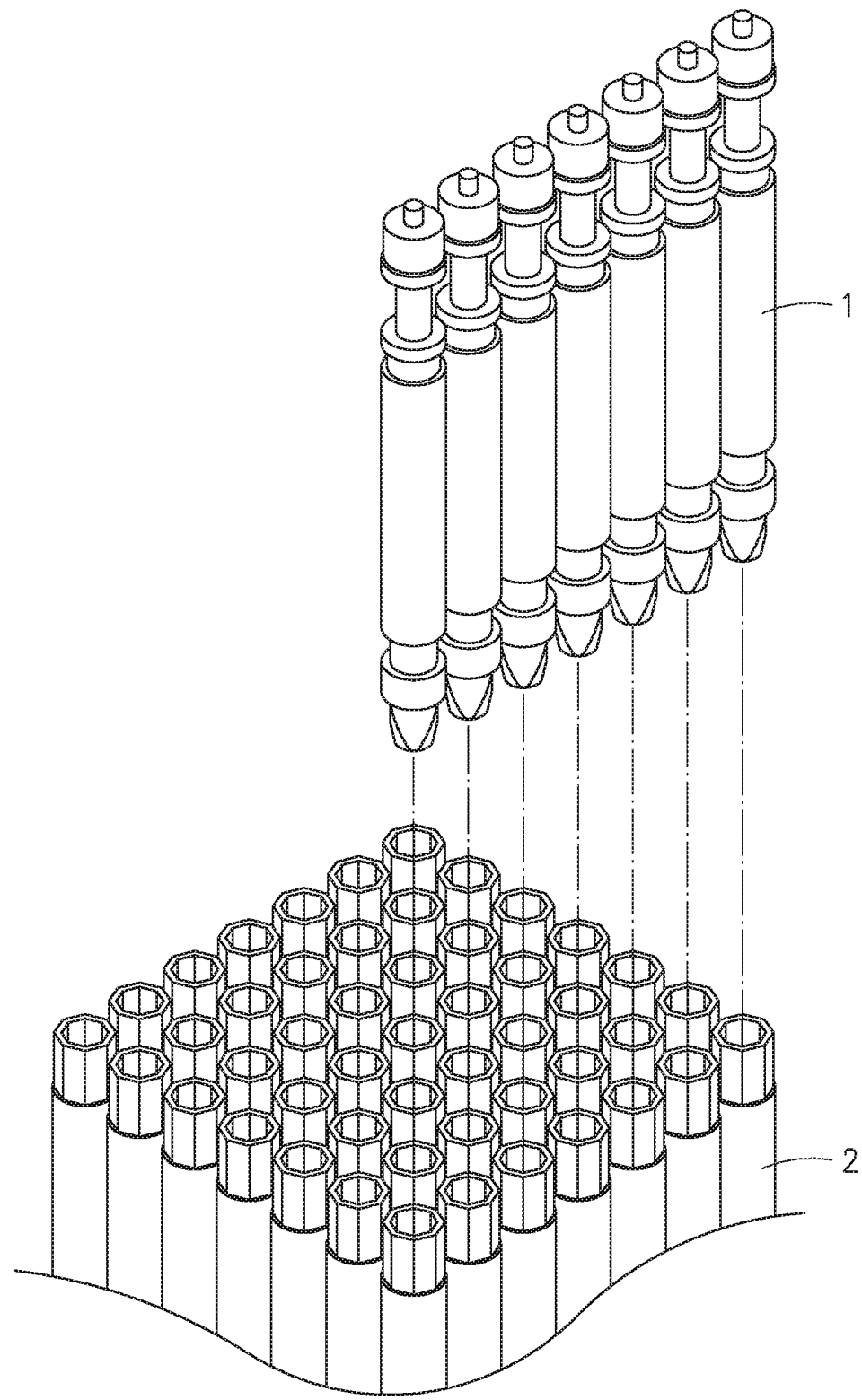
FIG. 7 is a schematic diagram showing the capping/de-capping process applying to array workpiece by using the magnetic screwdriver device of FIG. 1.

The magnetic screwdriver device 1 in accordance with the present disclosure is suitable for mass capping or de-capping process, such as removing/closing closures or lids from multiple sample tubes or reagent containers by a rotational movement. The friction force resulting from the rotation of the driving shaft and the driven shaft prevents overlocking. FIG. 7 is a schematic diagram showing the capping/de-capping process applying to array sample tubes by using the magnetic screwdriver device 1. In the present embodiment, a multiple of magnetic screwdriver devices 1 are arranged to be in matrix form matching to the vertical and horizontal intervals of the array sample tubes. Likewise, a multiple of magnetic screwdriver devices 1 can be arranged to be in at least one row. Therefore, capping/de-capping process applying to array sample tubes simultaneously can be achieved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A magnetic screwdriver device, comprising:
    a pad without magnetism;
    a driving shaft with magnetic attraction property disposed on one side of the pad and in touch with the pad; and
    a driven shaft disposed on the opposite side of the pad respectively to the driving shaft and in touch with the pad;
    wherein the driving shaft and the driven shaft have magnetic attraction between each other, and the driving shaft transmits torque to actuate the driven shaft rotate; the driven shaft will be stop when the torque exceeds a predetermined value.

2. The magnetic screwdriver device as claimed in claim 1, wherein at least one of the driving shaft and the driven shaft includes magnet or metal with magnetic attraction property such that the driving shaft and the driven shaft have magnetic attraction between each other.

3. The magnetic screwdriver device as claimed in claim 1, wherein the pad includes at least one of metal, plastic, rubber, ceramics and organic compound.

4. The magnetic screwdriver device as claimed in claim 3, wherein the pad includes Polydimethylsiloxane.

5. The magnetic screwdriver device as claimed in claim 1, wherein the axial end of the driven shaft includes a first groove for the pad to put into, and a part of the axial end of the driving shaft extends into the first groove and in touch with the pad.

6. The magnetic screwdriver device as claimed in claim 1, wherein the axial end of the driving shaft includes a second groove for the pad to put into, and a part of the axial end of the driven shaft extends into the second groove and in touch with the pad.

7. The magnetic screwdriver device as claimed in claim 1, wherein the driven shaft comprising:
    an axle body including one axial end displacing the pad and the driving shaft, and another axial end including a third groove;
    a buffer element displaced in the third groove; and
    a screwdriver including an axial end extending into the third groove and in touch with the buffer element.

8. The magnetic screwdriver device as claimed in claim 7, wherein the buffer includes a spring.

9. The magnetic screwdriver device as claimed in claim 7, wherein the axle body comprised a slot in connected to the third groove which the longitudinal direction of the slot being parallel to the axis of the axle body, and the axial end of the screwdriver extending into the third groove comprises a convex part embed in the slot.

* * * * *